US012165290B1

(12) United States Patent
Cheng

(10) Patent No.: US 12,165,290 B1
(45) Date of Patent: Dec. 10, 2024

(54) IMAGE PROCESSING METHOD AND APPARATUS

(71) Applicant: SHENZHEN XUMI YUNTU SPACE TECHNOLOGY CO., LTD., Shenzhen (CN)

(72) Inventor: Jianjie Cheng, Shenzhen (CN)

(73) Assignee: SHENZHEN XUMI YUNTU SPACE TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/709,825

(22) PCT Filed: Dec. 31, 2021

(86) PCT No.: PCT/CN2021/143563
§ 371 (c)(1),
(2) Date: May 14, 2024

(87) PCT Pub. No.: WO2023/082453
PCT Pub. Date: May 19, 2023

(30) Foreign Application Priority Data

Nov. 15, 2021 (CN) .......................... 202111348360.7

(51) Int. Cl.
*G06T 5/70* (2024.01)
*G06T 5/60* (2024.01)
*G06V 20/10* (2022.01)

(52) U.S. Cl.
CPC .................. *G06T 5/70* (2024.01); *G06T 5/60* (2024.01); *G06V 20/10* (2022.01); *G06T 2207/20081* (2013.01); *G06T 2207/20084* (2013.01)

(58) Field of Classification Search
None
See application file for complete search history.

(56) References Cited

U.S. PATENT DOCUMENTS

2018/0068463 A1* 3/2018 Risser ................... G06T 7/45
2019/0206091 A1  7/2019 Weng

FOREIGN PATENT DOCUMENTS

CN  110717863 A  1/2020
CN  111970510 A  11/2020
(Continued)

OTHER PUBLICATIONS

J. Wang, "Image Restoration on Residual Aggregation Network in Poor Weather Condition," 2020 International Conference on Computing, Electronics & Communications Engineering (iCCECE), Southend, UK, 2020, pp. 137-142, doi: 10.1109/iCCECE49321.2020.9231197.*

*Primary Examiner* — Jiangeng Sun
(74) *Attorney, Agent, or Firm* — Bayramoglu Law Offices LLC

(57) ABSTRACT

An image processing method and apparatus are provided. The method includes: acquiring a to-be-processed image; determining a weather type corresponding to the to-be-processed image; according to the weather type, acquiring an environment noise feature in the to-be-processed image corresponding to the weather type; and obtaining a non-noise image feature of the to-be-processed image according to the environment noise feature, and according to the environment noise feature, the non-noise image feature and the to-be-processed image, generating a denoised image corresponding to the to-be-processed image.

11 Claims, 8 Drawing Sheets

(56) References Cited

FOREIGN PATENT DOCUMENTS

| | | | | |
|---|---|---|---|---|
| CN | 112308804 A | * | 2/2021 | ......... G06K 9/00281 |
| CN | 112801888 A | | 5/2021 | |
| CN | 113436101 A | | 9/2021 | |
| JP | 6803899 B2 | * | 12/2020 | ............... G06N 3/02 |
| KR | 20150129263 A | * | 11/2015 | |

* cited by examiner

IMAGE PROCESSING METHOD AND APPARATUS

CROSS-REFERENCE TO THE RELATED APPLICATIONS

This application is the national phase entry of International Application No. PCT/CN2021/143563, filed on Dec. 31, 2021, which is based upon and claims priority to Chinese Patent Application No. 202111348360.7, filed on Nov. 15, 2021, the entire contents of which are incorporated herein by reference.

TECHNICAL FIELD

The present disclosure relates to the field of computer technologies, and in particular, to an image processing method and apparatus.

BACKGROUND

When extreme weather, such as heavy fog, heavy rain, heavy snow, or the like, occurs in an outdoor environment, images shot by an outdoor camera monitoring device may have problems of unclear scenarios and loss of image details, thus limiting applications of image identification and video monitoring in fields of traffic monitoring, target tracking, autonomous navigation, or the like, in the extreme weather.

An existing image enhancement algorithm based on deep learning and physical modeling can only solve image quality degradation under a certain extreme weather condition, for example, only can realize image rain removal or image defogging, but cannot solve the image quality degradation under more weather conditions by using a same technical framework; moreover, in a process of denoising and recovering the image shot in the extreme weather, the problems of unclear scenarios and loss of image details often occur; that is, problems of difficult thorough removal of noise, such as rain lines, mist, snowflakes, or the like, in the image and poor image recovery quality are caused.

SUMMARY

In view of this, embodiments of the present disclosure provide an image processing method and apparatus, a computer device, and a computer-readable storage medium, so as to solve a problem of poor image recovery quality in the prior art.

In a first aspect of the embodiments of the present disclosure, there is provided an image processing method, including:
  acquiring a to-be-processed image;
  determining a weather type corresponding to the to-be-processed image;
  according to the weather type, acquiring an environment noise feature in the to-be-processed image corresponding to the weather type; and
  obtaining a non-noise image feature of the to-be-processed image according to the environment noise feature, and according to the environment noise feature, the non-noise image feature and the to-be-processed image, generating a denoised image corresponding to the to-be-processed image.

In a second aspect of the embodiments of the present disclosure, there is provided an image processing apparatus, including:
  an image acquiring module configured to acquire a to-be-processed image;
  a type determining module configured to determine a weather type corresponding to the to-be-processed image;
  a feature acquiring module configured to, according to the weather type, acquire an environment noise feature in the to-be-processed image corresponding to the weather type; and
  an image generating module configured to obtain a non-noise image feature of the to-be-processed image according to the environment noise feature, and according to the environment noise feature, the non-noise image feature and the to-be-processed image, generate a denoised image corresponding to the to-be-processed image.

In a third aspect of the embodiments of the present disclosure, there is provided a computer device, including a memory, a processor and a computer program stored in the memory and runnable on the processor, wherein the processor, when executing the computer program, implements the steps of the above method.

In a fourth aspect of the embodiments of the present disclosure, there is provided a computer-readable storage medium storing a computer program, wherein the computer program, when executed by a processor, implements the steps of the above method.

Compared with the prior art, the embodiments of the present disclosure have the following beneficial effects: in the embodiments of the present disclosure, the to-be-processed image may be acquired first; then, the weather type corresponding to the to-be-processed image may be determined; then, according to the weather type, the environment noise feature in the to-be-processed image corresponding to the weather type may be acquired; then, according to the environment noise feature, the non-noise image feature of the to-be-processed image can be obtained, and according to the environment noise feature, the non-noise image feature and the to-be-processed image, the denoised image corresponding to the to-be-processed image is generated. In the embodiment, the environment noise features corresponding to different weather types can be acquired, the to-be-processed image can be denoised according to the environment noise features corresponding to the weather types, and a denoised region can be restored and recovered by using the non-noise image features; therefore, with the method according to the embodiment, noise caused by various weather types can be removed from the to-be-processed image, and image detail information can be recovered while the noise caused by various weather types is removed, thereby solving a problem of image quality degradation under more weather conditions by using a same technical framework, and improving image denoising and enhancing effects.

BRIEF DESCRIPTION OF THE DRAWINGS

In order to more clearly illustrate the technical solutions in the embodiments of the present disclosure, the accompanying drawings used in the description of the embodiments or the prior art will be briefly introduced below. It is apparent that, the accompanying drawings in the following description are only some embodiments of the present disclosure, and other drawings can be obtained by those of ordinary skill in the art from the provided drawings without creative efforts.

DETAILED DESCRIPTION OF THE EMBODIMENTS

In the following description, for the purpose of illustration instead of limitation, specific details such as a particular system structure and a technology are provided to make the embodiments of the present disclosure understood thoroughly. However, it should be understood by those skilled in the art that the present disclosure can also be implemented in other embodiments without the specific details. In other cases, detailed description of well-known systems, apparatuses, circuits and methods is omitted, so that the present disclosure is described without being impeded by unnecessary details.

An image processing method and apparatus according to embodiments of the present disclosure will be described in detail below with reference to the accompanying drawings.

In the prior art, an existing image enhancement algorithm based on deep learning and physical modeling can only solve image quality degradation under a certain extreme weather condition, for example, only can realize image rain removal or image defogging, but cannot solve the image quality degradation under more weather conditions by using a same technical framework; moreover, in a process of denoising and recovering an image shot in the extreme weather, the problems of unclear scenarios and loss of image details often occur; that is, problems of difficult thorough removal of noise, such as rain lines, mist, snowflakes, or the like, in the image and poor image recovery quality are caused.

In order to solve the above problems, the present invention provides an image processing method in which in the embodiment, environment noise features corresponding to different weather types can be acquired, the to-be-processed image can be denoised according to the environment noise features corresponding to the weather types, and a denoised region can be restored and recovered by using non-noise image features; therefore, with the method according to the embodiment, the noise caused by various weather types can be removed from the to-be-processed image, and image detail information can be recovered while the noise caused by various weather types is removed, thereby solving a problem of image quality degradation under more weather conditions by using a same technical framework, and improving image denoising and enhancing effects.

Figure 1:
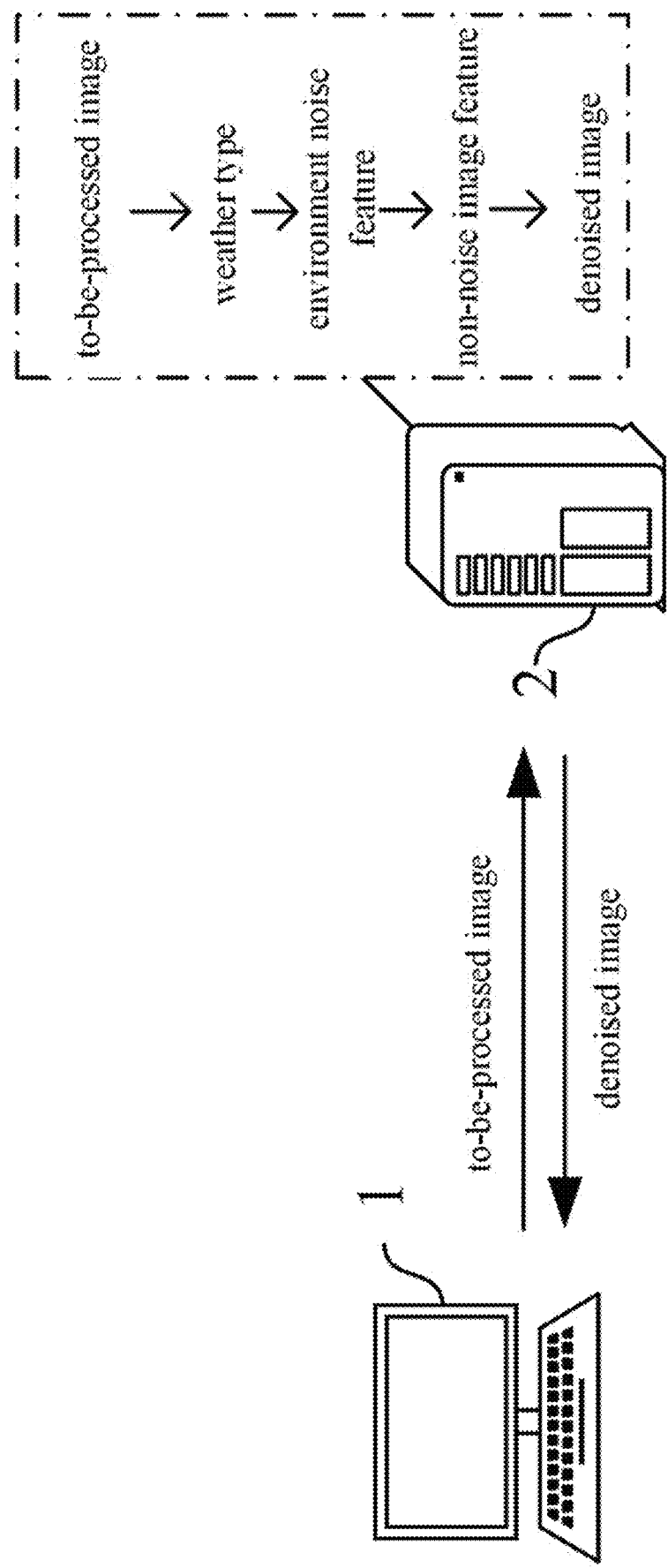
FIG. 1 is a schematic diagram of an application scenario of an embodiment of the present disclosure.

For example, the embodiment of the present invention may be applied to an application scenario as shown in FIG. 1. In this scenario, a terminal device 1 and a server 2 may be included.

The terminal device 1 may be hardware or software. When the terminal device 1 is hardware, the terminal device may be various electronic devices having functions of collecting images and storing the images, and supporting communication with the server 2, including but not limited to smart phones, tablet computers, laptop portable computers, digital cameras, monitors, video recorders, desktop computers, or the like; when the terminal device 1 is software, the terminal device may be installed in the electronic device as described above. The terminal device 1 may be implemented as a plurality of pieces of software or software modules, or may be implemented as a single piece of software or software module, which is not limited in the embodiment of the present disclosure. Further, various applications, such as an image collecting application, an image storing application, an instant chat application, or the like, may be installed on the terminal device 1.

The server 2 may be a server providing various services, for example, a background server receiving a request sent by a terminal device establishing communication connection with the server, and the background server may receive and analyze the request sent by the terminal device, and generate a processing result. The server 2 may be a server, or a server cluster composed of a plurality of servers, or a cloud computing service center, which is not limited in the embodiment of the present disclosure.

It should be noted that the server 2 may be hardware or software. When the server 2 is hardware, the server may be various electronic devices providing various services for the terminal device 1. When the server 2 is software, the server may be plural pieces of software or software modules providing various services for the terminal device 1, or may be a single piece of software or software module providing various services for the terminal device 1, which is not limited in the embodiment of the present disclosure.

The terminal device 1 and the server 2 may be communicatively connected through a network. The network may be a wired network formed by connection using a coaxial cable, a twisted pair cable, and an optical fiber, or may be a wireless network which can interconnect various communication devices without wiring, for example, Bluetooth, Near Field Communication (NFC), Infrared, or the like, which is not limited in the embodiment of the present disclosure.

Specifically, by the terminal device 1, a user may determine the to-be-processed image, and select to remove the noise in the to-be-processed image caused by weather. After receiving the to-be-processed image, the server 2 may determine the weather type corresponding to the to-be-processed image. Then, the server 2 may, according to the weather type, acquire the environment noise feature in the to-be-processed image corresponding to the weather type. Then, the server 2 may obtain the non-noise image feature of the to-be-processed image according to the environment noise feature, and according to the environment noise feature, the non-noise image feature and the to-be-processed image, generate a denoised image corresponding to the to-be-processed image. Finally, the server 2 may send the denoised image to the terminal device 1, such that the terminal device 1 presents the denoised image to the user. Thus, in the embodiment, the environment noise features corresponding to different weather types can be acquired, the to-be-processed image can be denoised according to the environment noise features corresponding to the weather types, and the denoised region can be restored and recovered by using the non-noise image features; therefore, with the method according to the embodiment, noise caused by various weather types can be removed from the to-be-processed image, and the image detail information can be recovered while the noise caused by various weather types is removed, thereby solving the problem of image quality degradation under more weather conditions by using the same technical framework, and improving the image denoising and enhancing effects.

It should be noted that specific types, numbers, and combinations of the terminal device 1, the server 2 and the network may be adjusted according to actual needs of the application scenario, which is not limited in the embodiment of the present disclosure.

It should be noted that the above application scenario is only shown for the convenience of understanding the present disclosure, and the embodiments of the present disclosure are not limited in any way in this respect. Rather, the embodiments of the present disclosure may be applied to any applicable scenario.

Figure 2:
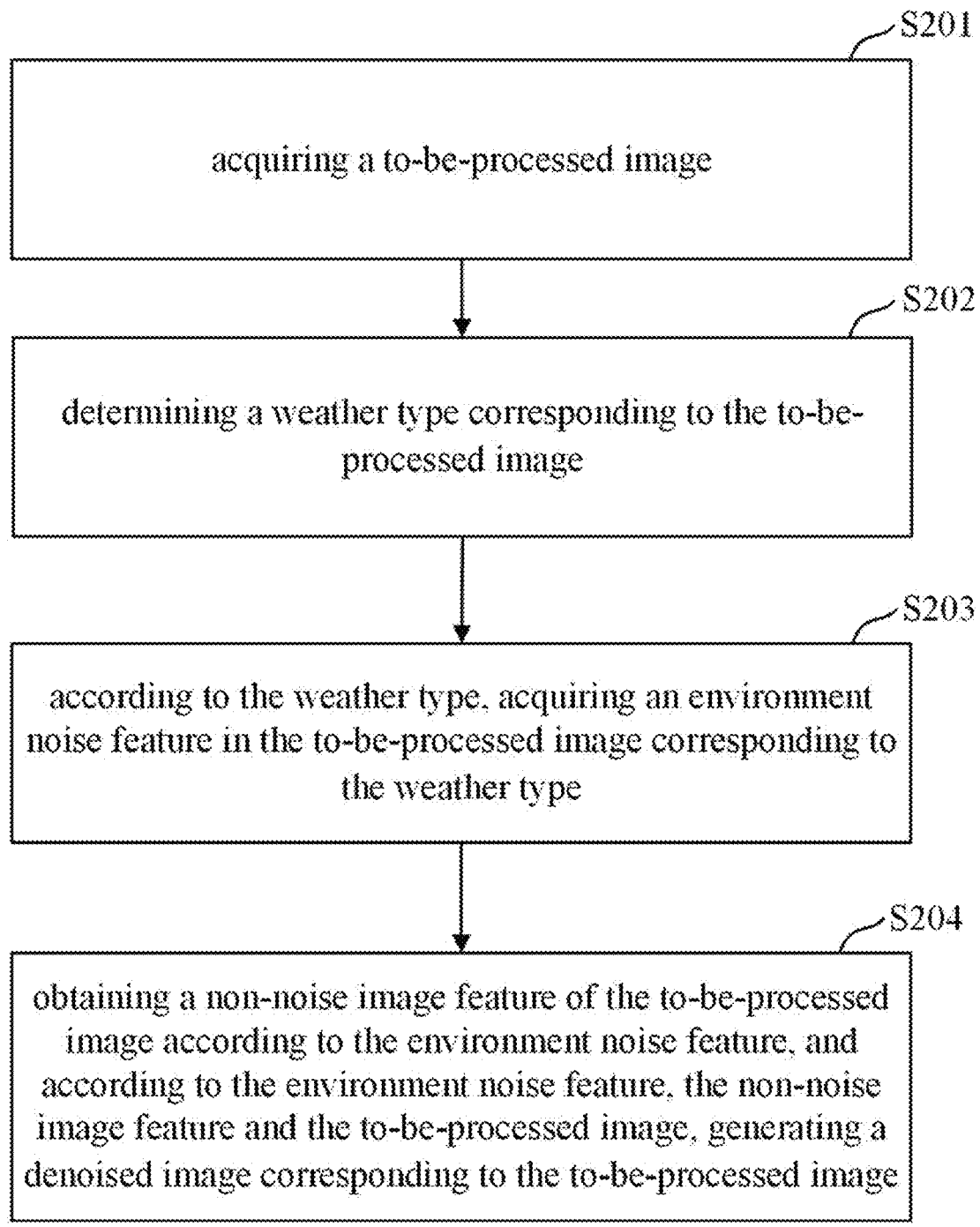
FIG. 2 is a flowchart of an image processing method according to the embodiment of the present disclosure.

FIG. 2 is a flowchart of an image processing method according to the embodiment of the present disclosure. The image processing method of FIG. 2 may be performed by the terminal device or the server of FIG. 1. As shown in FIG. 2, the image processing method includes:

S201: acquiring a to-be-processed image.

In the present embodiment, the to-be-processed image may be understood as an image or a video frame in which noise caused by weather is required to be removed. For example, an image or a video frame of a video taken in extreme weather (such as heavy fog, heavy rain, heavy snow, or the like) may be taken as the to-be-processed image. As an example, the terminal device may provide a page, the user may upload an image through the page and click a preset key to trigger removal of the noise in the image caused by weather, and at this point, the image may be used as the to-be-processed image.

S202: determining a weather type corresponding to the to-be-processed image.

Characteristics of the noise caused by different kinds of weather are different; for example, the noise caused by different weather types has different shapes and different distribution manners. For example, in an implementation, the weather type may include rain, snow and fog; if the weather type is rain, the noise caused by the weather type is rain lines, the rain lines are linear, the distribution manner of the rain lines can include directions of the rain lines and a density of the rain lines, the density of the rain lines can include a large density, a medium density, and a small density according to a dense degree of the rain lines, and the directions of the rain lines can be understood as rain falling directions corresponding to the rain lines; if the weather type is snow, the noise caused by the weather type is snowflakes, the snowflakes have flake shapes, the distribution manner of the snowflakes can include directions of the snowflakes and a density of the snowflakes, the density of the snowflakes can include a large density, a medium density and a small density according to a dense degree of the snowflakes, and the directions of the snowflakes can be understood as snowflake falling directions corresponding to the snowflakes; if the weather type is fog, the noise caused by the weather type is mist, the distribution manner of the mist can include a concentration of the mist, and a distribution position of the mist is a random position. Therefore, after the to-be-processed image is acquired, the weather type corresponding to the to-be-processed image can be determined first, such that the environment noise features can be subsequently extracted according to characteristics of the noise corresponding to different weather types.

In the present embodiment, weather type classification can be performed on the to-be-processed image using an image processing algorithm, so as to determine the weather type corresponding to the to-be-processed image. Certainly, weather type classification can be performed on the to-be-processed image using a neural network, so as to determine the weather type corresponding to the to-be-processed image. It should be noted that other classification methods may be adopted in the present embodiment to classify the weather type of the to-be-processed image, and are not repeated one by one herein.

S203: according to the weather type, acquiring an environment noise feature in the to-be-processed image corresponding to the weather type.

In order to remove the noise in the to-be-processed image caused by the weather, the environment noise feature in the to-be-processed image corresponding to the weather type may be obtained first according to the noise characteristic corresponding to the weather type of the to-be-processed image, such that the noise corresponding to the weather type may be removed subsequently according to the environment noise feature corresponding to the weather type. It may be understood that the environment noise feature corresponding to one weather type may be understood as a feature capable of reflecting a distribution situation of the environment noise corresponding to the weather type in the to-be-processed image; for example, the environment noise feature corresponding to one weather type may include a shape, a distribution density, a distribution concentration, a distribution region, or the like, of the noise corresponding to the weather type in the to-be-processed image; it should be noted that a feature form of the environment noise feature may be a feature map or a feature matrix, which is not limited in the present embodiment.

That is, in the present embodiment, after the weather type of the to-be-processed image is determined, noise distribution situation information related to the noise characteristic corresponding to the weather type may be extracted from the to-be-processed image according to the noise characteristic corresponding to the weather type. Then, the environment noise feature corresponding to the weather type may be generated according to the noise distribution situation information.

For example, assuming that the weather type of the to-be-processed image is rain, the distribution situation information of the rain lines, such as shapes of the rain lines, the directions of the rain lines, the density of the rain lines, positions of the rain lines, or the like, in the to-be-processed image may be extracted, and a rain line noise feature may be generated according to the distribution situation information of the rain lines in the to-be-processed image; it may be understood that if the weather type is rain, the environment noise feature is the rain line noise feature.

For another example, assuming that the weather type of the to-be-processed image is snow, the distribution situation information of the snowflakes, such as shapes of the snowflakes, the directions of the snowflakes, the density of the snowflakes, positions of the snowflakes, or the like, in the to-be-processed image may be extracted, and a snowflake noise feature may be generated according to the distribution situation information of the snowflakes in the to-be-processed image; it may be understood that if the weather type is snow, the environment noise feature is the snowflake noise feature.

For another example, assuming that the weather type of the to-be-processed image is fog, the distribution situation information of the mist, such as the concentration of the mist, a position of the mist, or the like, in the to-be-processed image may be extracted, and a mist noise feature may be generated according to the distribution situation information of the mist in the to-be-processed image; it may be understood that if the weather type is fog, the environment noise feature is the mist noise feature.

S204: obtaining a non-noise image feature of the to-be-processed image according to the environment noise feature, and according to the environment noise feature, the non-noise image feature and the to-be-processed image, generating a denoised image corresponding to the to-be-processed image.

In the present embodiment, after the environment noise feature is acquired, a region in the to-be-processed image other than a region corresponding to the environment noise feature may be used as a non-noise image region, and feature extraction may be performed on the non-noise image region to obtain the non-noise image feature. It may be understood that the non-noise image feature is a feature capable of reflecting details of the non-noise image region in the to-be-processed image; for example, the non-noise image feature may include feature information such as a texture feature, an edge feature, a color feature, a shape feature, a spatial feature, or the like, of the non-noise image region.

Then, the noise in the to-be-processed image corresponding to the weather type may be removed by utilizing the environment noise feature; for example, the position of the noise in the to-be-processed image corresponding to the weather type may be determined by using the environment noise feature, and a pixel value of a pixel corresponding to the position of the noise may be adjusted to a preset initial value. It should be noted that since the environment noise feature is extracted based on the noise characteristic corresponding to the weather type, the obtained environment noise feature can more clearly reflect a physical feature of the noise (such as the rain lines, the mist, and the snowflakes) in the to-be-processed image corresponding to the weather type, such that an effect of removing the noise in the to-be-processed image corresponding to the weather type can be improved by removing the noise in the to-be-processed image corresponding to the weather type by using the environment noise feature. It is further emphasized that, in the embodiment, the environment noise features are extracted for the noise characteristics corresponding to different weather types, such that with the method according to the present embodiment, the noise caused by multiple weather types can be compatibly removed; that is, the noise caused by each weather type can be removed using the method according to the present embodiment, thereby solving the problem of image quality degradation under more weather conditions by using the same technical framework.

Then, the image detail information of the noise-removed region may be recovered and restored by using the non-noise image feature of the to-be-processed image. It should be noted that the non-noise image features include features of details of the non-noise image region in the to-be-processed image; that is, the non-noise image features can more clearly reflect the physical features of the non-noise image region in the to-be-processed image; therefore, a feature relationship between the noise-removed region and the non-noise image region can be calculated by using the non-noise image features, such that the image details of the noise-removed region can be restored according to the non-noise image feature to obtain the denoised image corresponding to the to-be-processed image; for example, a target pixel value of the pixel in the noise-removed region is calculated according to the non-noise image feature, and the pixel value of the pixel in the noise-removed region is adjusted to the target pixel value. Therefore, an image detail recovery degree of the to-be-processed image after the noise is removed can be improved, thereby reducing a distortion degree of the to-be-processed image after the noise is removed, and then improving a definition degree of the denoised image corresponding to the to-be-processed image.

Therefore, compared with the prior art, the embodiments of the present disclosure have the following beneficial effects: in the embodiments of the present disclosure, the to-be-processed image may be acquired first; then, the weather type corresponding to the to-be-processed image may be determined; then, according to the weather type, the environment noise feature in the to-be-processed image corresponding to the weather type may be acquired; then, according to the environment noise feature, the non-noise image feature of the to-be-processed image can be obtained, and according to the environment noise feature, the non-noise image feature and the to-be-processed image, the denoised image corresponding to the to-be-processed image is generated. In the embodiment, the environment noise features corresponding to different weather types can be acquired, the to-be-processed image can be denoised according to the environment noise features corresponding to the weather types, and a denoised region can be restored and recovered by using the non-noise image features; therefore, with the method according to the embodiment, the noise caused by various weather types can be removed from the to-be-processed image, and the image detail information can be recovered while the noise caused by various weather types is removed, thereby solving the problem of image quality degradation under more weather conditions by using the same technical framework, and improving the image denoising and enhancing effects.

Next, an implementation of S202 (i.e., classification of the weather type of the to-be-processed image by using the neural network) will be described. In the present embodiment, the S202 of determining a weather type corresponding to the to-be-processed image may include the following steps:

inputting the to-be-processed image into a trained weather type classification model to obtain the weather type corresponding to the to-be-processed image.

Figure 3:
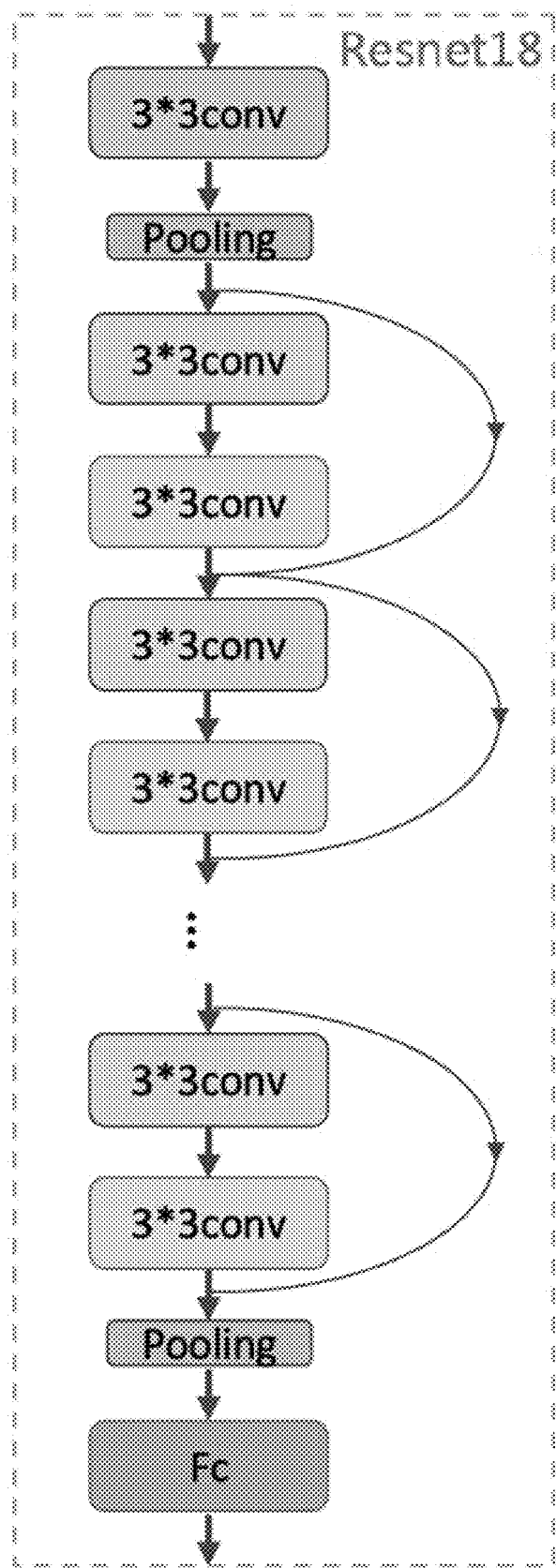
FIG. 3 is a schematic diagram of a network architecture of Resnet18 in the embodiment of the present disclosure.

In the present embodiment, the weather type classification model may be a residual network obtained by performing training based on a sample image and a weather type label corresponding to the sample image. In an implementation, the residual network may be a Resent18 network as shown in FIG. 3. In the present embodiment, a plurality of groups of training samples may be preset, and each group of training samples includes the sample image and the weather type label corresponding to the sample image. A method for training the residual network by using the preset training samples may include: inputting the sample image in each group of training samples into the residual network to obtain a predicted weather type corresponding to the sample image, then determining a loss value according to the weather type label corresponding to the sample image and the predicted weather type, and then adjusting network parameters of the residual network by using the loss value until the residual network meets training conditions, such as a condition that the network parameters of the residual network fit or training times meet a preset training threshold, so as to obtain the trained weather type classification model. For example, assuming that the preset weather type includes rain, fog and snow, the weather type of the to-be-processed image which is one of rain, fog and snow can be obtained by inputting the to-be-processed image into the trained weather type classification model.

Next, an implementation of S203 (i.e., acquisition of the environment noise feature in the to-be-processed image corresponding to the weather type) will be described. In the present embodiment, the S203 of according to the weather type, acquiring an environment noise feature in the to-be-processed image corresponding to the weather type may include the following steps:

S203a: determining an image enhancement model corresponding to the weather type according to the weather type, the image enhancement model including a noise feature extraction module.

In an implementation of the present embodiment, different image enhancement models may be set for different weather types respectively. It should be noted that model network architectures of the image enhancement models corresponding to different weather types are all the same, and there exists only a difference that the training samples of the image enhancement models corresponding to different weather types are different. For example, assuming that the sample image in the training sample of the image enhancement model corresponding to the weather type "rain" is an image with the rain line noise, a sample denoised image corresponding to the sample image is an image with the rain line noise removed and the image details recovered; assuming that the sample image in the training sample of the image enhancement model corresponding to the weather type "snow" is an image with the snowflake noise, a sample denoised image corresponding to the sample image is an image with the snowflake noise removed and the image details recovered; assuming that the sample image in the training sample of the image enhancement model corresponding to the weather type "fog" is an image with the mist noise, a sample denoised image corresponding to the sample image is an image with the mist noise removed and the image details recovered. It can be understood that the model network architectures of the image enhancement models corresponding to different weather types are all the same, but model network parameters of the image enhancement models corresponding to different weather types may be different; it should be emphasized that, since implementation methods described later are all described with respect to an implementation at a network architecture level, the implementation described later is applicable to the image enhancement models corresponding to all weather types. Certainly, in another implementation of the present embodiment, the same image enhancement model may be set for all weather types; that is, all the weather types correspond to the same image enhancement model, and it can be understood that, in the implementation, the image enhancement model is obtained by performing training based on the sample images corresponding to all the weather types and the denoised images corresponding to the sample images. It should be noted that, in the present embodiment, a case where different image enhancement models are set for different weather types respectively will be mainly exemplified.

In the case where different image enhancement models are set for different weather types respectively, after the weather type of the to-be-processed image is obtained, the image enhancement model corresponding to the weather type can be determined in all the trained image enhancement models according to the weather type. As an example, the image enhancement model corresponding to each weather type is provided with a type identifier corresponding to the weather type, such that after the weather type of the to-be-processed image is obtained, the image enhancement model with the type identifier same as a type identifier corresponding to the weather type can be determined in all the trained image enhancement models according to the type identifier corresponding to the weather type.

S203b: inputting the to-be-processed image into the noise feature extraction module to obtain the environment noise feature in the to-be-processed image corresponding to the weather type.

Figure 4A:
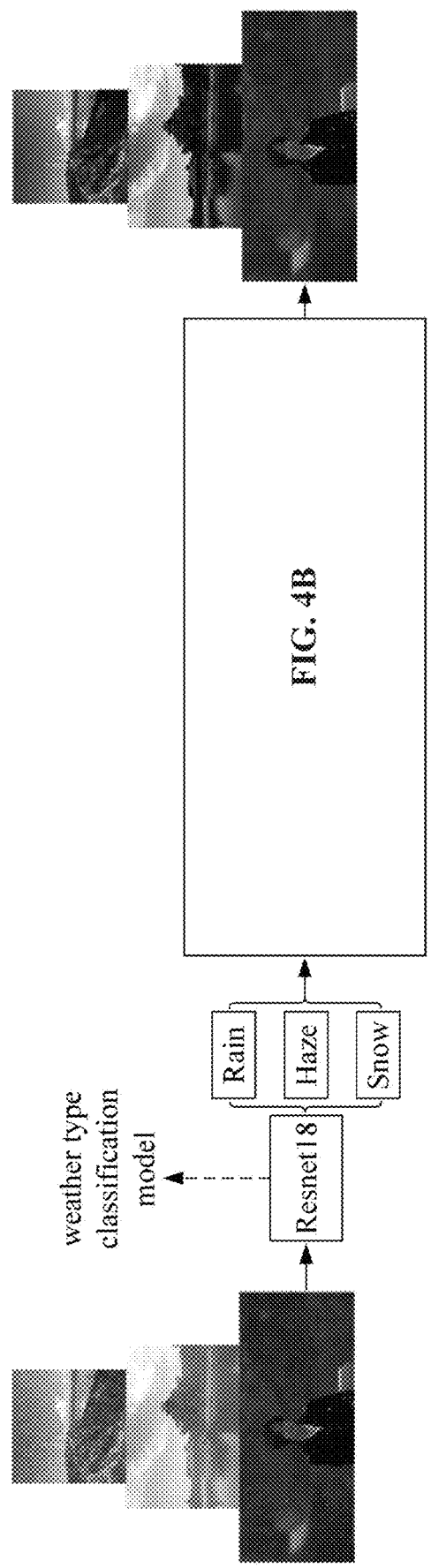
FIGS. 4A-4B show a schematic diagram of a network architecture of an image enhancement model in the embodiment of the present disclosure.
Figure 4B:
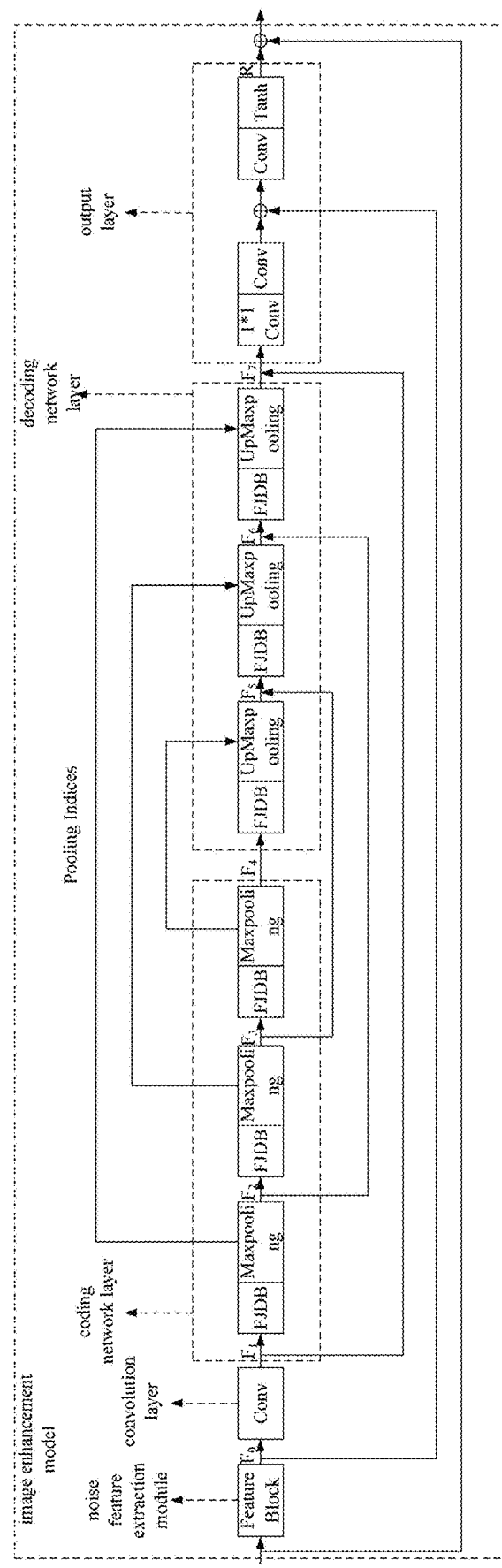

In the present embodiment, as shown in FIGS. 4A-4B, the image enhancement model may include the noise feature extraction module. After the to-be-processed image is obtained, the environment noise feature in the to-be-processed image corresponding to the weather type may be acquired using the image enhancement model first, such that the environment noise feature can be used for noise removal subsequently.

In an implementation, as shown in FIGS. 4A-4B, the noise feature extraction module may be a multi-scale feature extraction network module (feature block). A process of extracting the environment noise feature by the noise feature extraction module may be defined as $F_0=H_0(I_0)$, wherein $I_0$ represents the to-be-processed image, $H_0$ represents a feature computation function of the feature block, and $F_0$ is the obtained environment noise feature.

In order to extract the features of the noise with different shapes and different distribution manners (such as the rain line noise features with different directions and different sizes, the mist noise features with different concentrations, and the snowflake noise features with different directions and different sizes), the noise feature extraction module may include N expansion convolution layers and aggregation convolution layers, convolution kernel expansion sizes of the expansion convolution layers are different, and N is a positive integer greater than 1. It should be noted that, since the convolution kernel expansion sizes of the expansion convolution layers are different, numbers of interval pixels between adjacent pixels collected by the expansion convolution layers in a convolution calculation process are different, such that sizes of receptive fields of the expansion convolution layers are also different, and then, first noise features extracted by the expansion convolution layers are also different (for example, the sizes are different, and contained image feature information is also different); therefore, the first noise features with different scales, such as the rain lines with different sizes and the mist with different concentrations, can be extracted, more context space information can be aggregated in the training process, and trained parameters are fewer, such that the model is easier to train to realize fitting.

Specifically, in the implementation, the to-be-processed image may be input into the N expansion convolution layers to obtain N first noise features, and the sizes of the first noise features are different. Then, the N first noise features can be aggregated using the aggregation convolution layer to obtain the environment noise feature in the to-be-processed image corresponding to the weather type, and since the image feature information included in the first noise features of different scales is different, in the process of obtaining the environment noise feature by aggregating the N first noise features, more context space information may be aggregated, and information in the environment noise feature obtained by aggregation is more abundant, such that extraction of the feature of the noise in the to-be-processed image may be significantly improved; that is, the obtained environment noise feature may more clearly reflect the noise in the to-be-processed image corresponding to the weather type.

Figure 5:
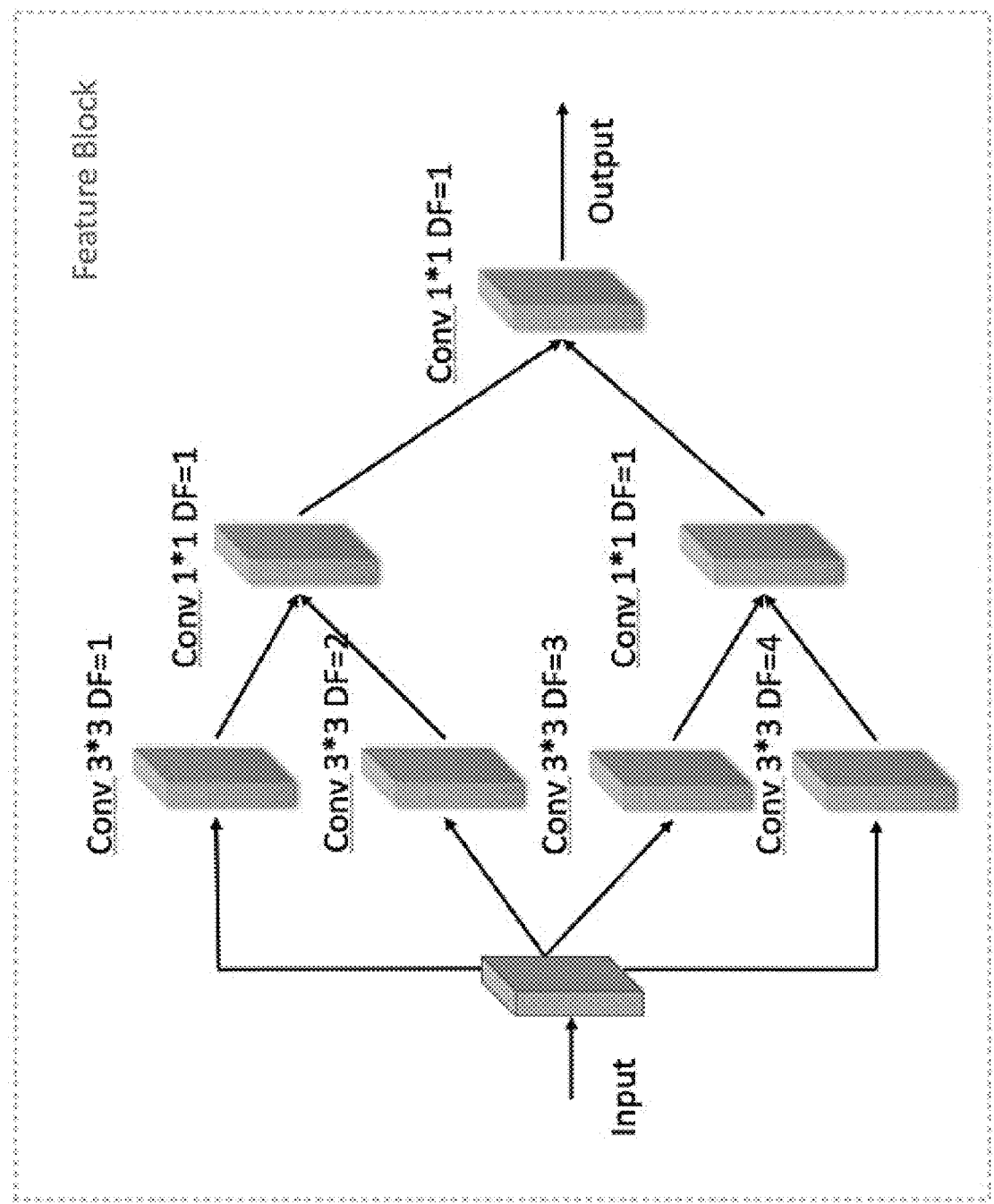
FIG. 5 is a schematic diagram of a network architecture of a noise feature extraction module in the embodiment of the present disclosure.

Next, a specific implementation of S203b will be exemplified with reference to FIG. 5. As shown in FIG. 5, the noise feature extraction module may include 4 expansion convolution layers and 3 aggregation convolution layers; specifically, the 4 expansion convolution layers include a first expansion convolution layer (Conv 3×3 DF=1), a second expansion convolution layer (Conv 3×3 DF=2), a third expansion convolution layer (Conv 3×3 DF=3), and a fourth expansion convolution layer (Conv 3×3 DF=4), and the aggregation convolution layers include a first aggregation convolution layer (Conv 1×1 DF=1), a second aggregation convolution layer (Conv 1×1 DF=2) and a third aggregation convolution layer (Conv 1×1 DF=3); the first expansion convolution layer is a convolution layer having a convolution kernel of 3×3 and DF=1 (DF=1 means that no interval exists between adjacent pixels collected during the convolution calculation), the second expansion convolution layer is a convolution layer having a convolution kernel of 3×3 and DF=2 (DF=2 means that one interval pixel exists between the adjacent pixels collected during the convolution calculation), the third expansion convolution layer is a convolution layer having a convolution kernel of 3×3 and DF=3 (DF=3 means that two interval pixels exist between the adjacent pixels collected during the convolution calculation), the fourth expansion convolution layer is a convolution layer having a convolution kernel of 3×3 and DF=4 (DF=4 means that three interval pixels exist between the adjacent pixels collected during the convolution calculation), and the first aggregation convolution layer, the second aggregation convolution layer, and the third aggregation convolution layer are all convolution layers having a convolution kernel of 1×1 and DF=1. Specifically, the to-be-processed image is input into the first expansion convolution layer, the second expansion convolution layer, the third expansion convolution layer and the fourth expansion convolution layer, so as to obtain four first noise features. Two first noise features output by the first expansion convolution layer and the second expansion convolution layer are input into the first aggregation convolution layer to obtain a first sub-aggregation feature; two first noise features output by the third expansion convolution layer and the fourth expansion convolution layer are input into the second aggregation convolution layer to obtain a second sub-aggregation feature; the first sub-aggregation feature and the second sub-aggregation feature are input into the third aggregation convolution layer to obtain the environment noise feature in the to-be-processed image corresponding to the weather type. It should be noted that, in this example, the features of different scales are aggregated by using the convolution layer with the convolution kernel of 1×1, feature information (i.e., the environment noise feature) obtained through 3 times of feature aggregation is more abundant, and the extraction of the environment noise feature of the weather image is significantly improved.

Next, an implementation of S204 (i.e., generation of the denoised image corresponding to the to-be-processed image) will be described. In the present embodiment, the S204 of obtaining a non-noise image feature of the to-be-processed image according to the environment noise feature, and according to the environment noise feature, the non-noise image feature and the to-be-processed image, generating a denoised image corresponding to the to-be-processed image may include the following steps:

S204a: inputting the environment noise feature into a convolution layer to obtain a first feature map.

In the present embodiment, as shown in FIGS. 4A-4B, the image enhancement model further includes the convolution layer. After obtained, the environment noise feature is input into the convolution layer to be subjected to convolution, so as to obtain the first feature map.

S204b: inputting the first feature map into a coding network layer to obtain P downsampled feature maps and P non-noise image features, P being a positive integer larger than 1.

In the present embodiment, as shown in FIGS. 4A-4B, the image enhancement model further includes the coding network layer. The coding network layer can include P cascaded coding network modules, and each coding network module includes a feature aggregation dense convolution module and a max-pooling layer; in an implementation, as shown in FIGS. 4A-4B, one coding network module may include a feature aggregation dense convolution module and a max-pooling layer; for example, the feature aggregation dense convolution module may be a feature joint dense block (FJDB) in FIGS. 4A-4B, and the max-pooling layer may be Maxpooling in FIGS. 4A-4B.

In the present embodiment, in an encoding stage, the first feature map may be input into the coding network layer, and feature extraction is performed on the first feature map by using the P cascaded coding network modules of the coding network layer, so as to obtain P downsampled feature maps and P non-noise image features; it should be noted that the P cascaded coding network modules in the coding network layer may be understood as downsampling convolution layers, sizes of the feature maps output by the P cascaded coding network modules are different, and the feature map output by the coding network module ranked further behind has a smaller size. The downsampled feature map can be understood as a sum of the features of the same scale, and the downsampled feature map can be used for removing the noise caused by the weather; the non-noise image features are image details lost at a pooling stage (i.e., a stage when the coding network module performs the feature extraction) and recorded by pooling indices at the stage, and the non-noise image features can be used for recovering detail features lost at the stage when the coding network module performs the feature extraction by performing guiding in an upsampling stage (i.e., a subsequent decoding stage).

Specifically, the first feature map may be input to the feature aggregation dense convolution module in a first coding network module, so as to obtain the downsampled feature map and the non-noise image feature output by the max-pooling layer in the first coding network module. The downsampled feature map output by a (i−1)th coding network module can be input into the feature aggregation dense convolution module in an ith coding network module, so as to obtain the downsampled feature map and the non-noise image feature output by the max-pooling layer in the ith coding network module; i is a positive integer greater than 1 and less than or equal to P.

As an example, as shown in FIGS. 4A-4B, the coding network layer may include 3 cascaded coding network modules which are a first coding network module, a second coding network module, and a third coding network module respectively; each coding network module includes a feature aggregation dense convolution module (i.e., FJDB) and a max-pooling layer (Maxpooling). A first feature map $F_1$ is input into the first coding network module, and the first coding network module outputs a downsampled feature map $F_2$ and a non-noise image feature; the downsampled feature map $F_2$ output by the first coding network module is input into the feature aggregation dense convolution module in the second coding network module to obtain a downsampled feature map $F_3$ and a non-noise image feature output by the max-pooling layer in the second coding network module; and the downsampled feature map $F_3$ output by the second coding network module is input into the feature aggregation dense convolution module in the third coding network module to obtain a downsampled feature map $F_4$ and a non-noise image feature output by the max-pooling layer in the third coding network module.

S205c: inputting the P downsampled feature maps and the P non-noise image features into a decoding network layer to obtain a denoised feature map.

In the present embodiment, as shown in FIGS. 4A-4B, the image enhancement model further includes the decoding network layer. The decoding network layer includes P cascaded decoding network modules, and each decoding network module includes a feature aggregation dense convolution module and an upsampling max-pooling layer; in an implementation, as shown in FIGS. 4A-4B, one decoding network module may include a feature aggregation dense convolution module and an upsampling max-pooling layer; for example, the feature aggregation dense convolution module may be a feature joint dense block (FJDB) in FIGS. 4A-4B, and the upsampling max-pooling layer may be UpMaxpooling in FIGS. 4A-4B. Each decoding network module corresponds to one coding network module, and the input of the decoding network module includes the downsampled feature map and the non-noise image feature output by the corresponding coding network module.

In the present embodiment, in a decoding stage, the to-be-processed image, the P downsampled feature maps and the P non-noise image features may be input into the P cascaded decoding network modules of the decoding network layer, such that the P cascaded decoding network modules remove the noise corresponding to the weather type in the to-be-processed image by using the P downsampled feature maps, and obtain the denoised feature map by using the P non-noise image features and recovering and restoring the image detail information. It should be noted that the P cascaded decoding network modules in the decoding network layer may be understood as upsampling convolution layers, sizes of the feature maps output by the P cascaded decoding network modules are different, and the feature map output by the decoding network module ranked further behind has a larger size. Therefore, in the present embodiment, a long-term spatial feature dependency relationship can be calculated by integrating the coding network layer and the decoding network layer. In the present embodiment, loss and supplement of the image detail information of the downsampling stage (i.e., the encoding stage) and the upsampling stage (i.e., the decoding stage) are recorded by using the pooling indices, each max-pooling layer (Maxpooling) of the encoding stage corresponds to one upsampling max-pooling layer (UpMaxpooling), and the max-pooling layer (Maxpooling) guides upsampling of the upsampling max-pooling layer (UpMaxpooling) through the pooling indices, such that more image details can be recovered in the upsampling stage.

Specifically, the downsampled feature map output by a Pth coding network module may be input to the feature aggregation dense convolution module in a first decoding network module, and the non-noise image feature output by the Pth coding network module is input to the upsampled max-pooling layer in the first decoding network module, so as to obtain an upsampled feature map output by the upsampling max-pooling layer. The downsampled feature map output by a (P−j)th coding network module and the upsampled feature map output by the upsampling max-pooling layer in a jth decoding network module can be input into the feature aggregation dense convolution module in a (1+j)th decoding network module; the non-noise image feature output by the (P−j)th coding network module is input into the upsampling max-pooling layer in the (1+j)th decoding network module, so as to obtain the upsampled feature map output by the upsampling max-pooling layer in the (1+j)th decoding network module; j is a positive integer equal to or greater than 1 and less than P. The upsampled feature map output by the upsampling max-pooling layer in the Pth decoding network module can be used as the denoised feature map.

As an example, as shown in FIGS. 4A-4B, the coding network layer may include 3 cascaded coding network modules which are a first coding network module, a second coding network module, and a third coding network module respectively; the decoding network layer may include 3 cascaded decoding network modules which are a first decoding network module, a second decoding network module, and a third decoding network module respectively. The downsampled feature map $F_4$ output by the third coding network module may be input to the feature aggregation dense convolution module in the first decoding network module, and the non-noise image feature output by the third coding network module is input to the upsampling max-pooling layer in the first decoding network module, so as to obtain an upsampled feature map $F_5$ output by the upsampling max-pooling layer. The downsampled feature map $F_3$ output by the second coding network module and the upsampled feature map $F_5$ output by the upsampling max-pooling layer in the first decoding network module can be input into the feature aggregation dense convolution module in the second decoding network module; the non-noise image feature output by the second coding network module is input into the upsampling max-pooling layer in the second decoding network module, so as to obtain the upsampled feature map $F_6$ output by the upsampling max-pooling layer in the second decoding network module. The downsampled feature map $F_2$ output by the first coding network module and the upsampled feature map $F_6$ output by the upsampling max-pooling layer in the second decoding network module may be input into the feature aggregation dense convolution module in the third decoding network module; and the non-noise image feature output by the first coding network module is input into the upsampling max-pooling layer in the third decoding network module, so as to obtain the upsampled feature map $F_7$ output by the upsampling max-pooling layer in the third decoding network module, and the upsampled feature map $F_7$ output by the upsampling max-pooling layer in the third decoding network module may be taken as the denoised feature map.

S206d: inputting the denoised feature map, the first feature map, the environment noise feature and the to-be-processed image into an output layer to obtain the denoised image corresponding to the to-be-processed image.

In the present embodiment, as shown in FIGS. 4A-4B, the image enhancement model further includes the output layer. The denoised feature map, the first feature map, the environment noise feature and the to-be-processed image are input into the output layer to obtain the denoised image corresponding to the to-be-processed image; for example, the output layer may fuse the denoised feature map, the first feature map, the environment noise feature and the to-beprocessed image to obtain the denoised image corresponding to the to-be-processed image.

In an implementation, as shown in FIGS. 4A-4B, the output layer includes a first output layer and a second output layer, the first output layer includes a convolution layer (1×1Conv) having a convolution kernel with a size of 1×1 and a convolution layer (Conv), and the second output layer includes a convolution layer (Conv) and an activation function layer (e.g., a Tanh function layer, i.e., Tanh). Input of the first output layer is the denoised feature map and the first feature map, and output of the first output layer is a first output feature map; input of the second output layer is a fusion feature of the first output feature map and the environment noise feature $F_O$, and output of the second output layer is a second output feature map; then, the second output feature map and the to-be-processed image may be fused to obtain the denoised image corresponding to the to-be-processed image.

It should be noted that each of the feature aggregation dense convolution modules mentioned in the above embodiments includes M expansion convolution layers, a dense connection network module, and a fully connected layer. Expansion sizes of the convolution kernels of the expansion convolution layers are different, and M is a positive integer greater than 1.

Figure 6:
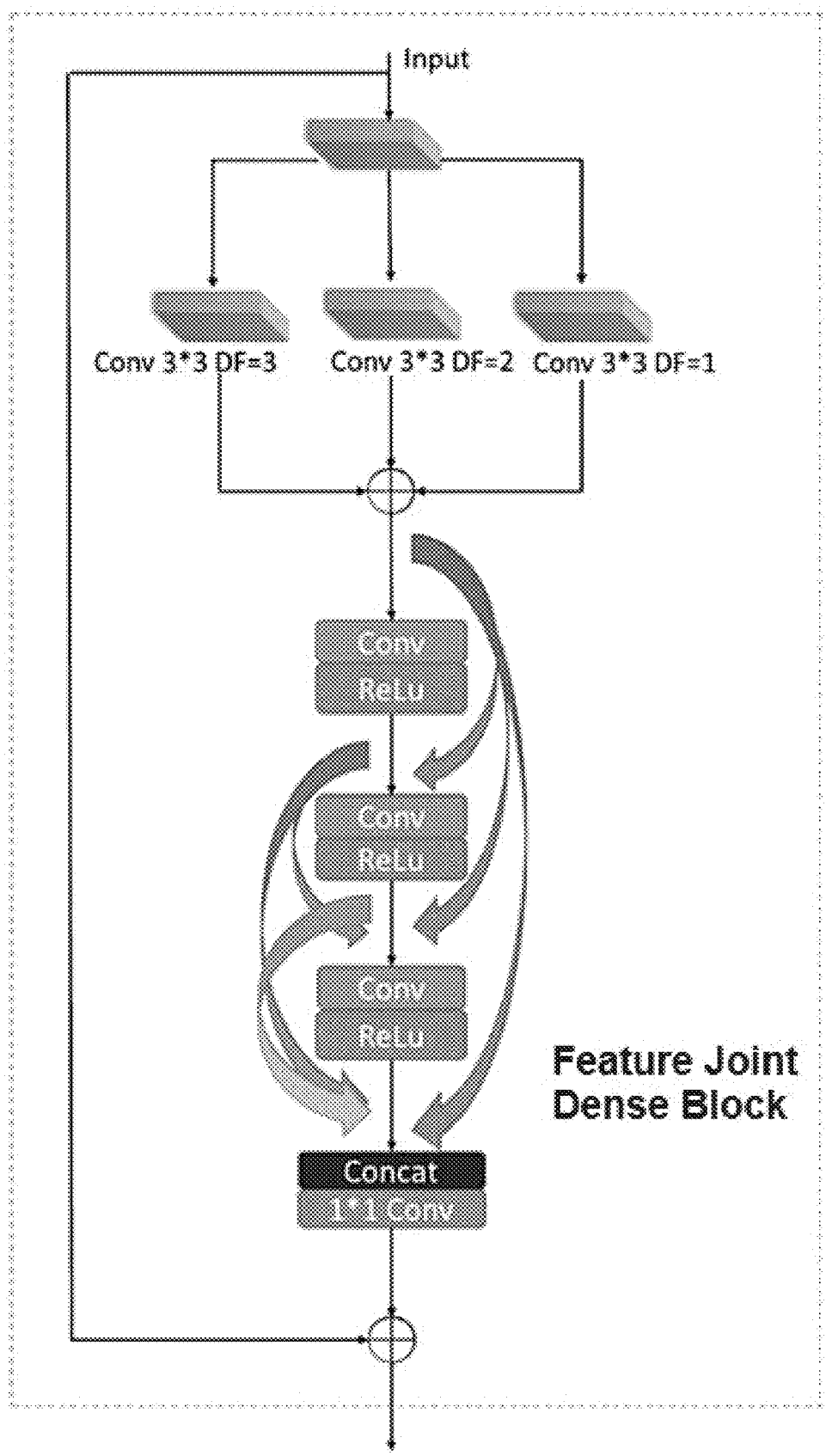
FIG. 6 is a schematic diagram of a network architecture of a feature aggregation dense convolution module in the embodiment of the present disclosure.

The M expansion convolution layers are configured to generate M second noise features according to a feature map (such as the first feature map, the downsampled feature map and the upsampled feature map), and sizes of the second noise features are different; specifically, the feature map may be input into the M expansion convolution layers to obtain the M second noise features. For example, as shown in FIG. 6, one feature aggregation dense convolution module may include 3 expansion convolution layers, the three expansion convolution layers being a first sub-expansion convolution layer (Conv 3×3 DF=1), a second sub-expansion convolution layer (Conv 3×3 DF=2), and a third sub-expansion convolution layer (Conv 3×3 DF=3) respectively; the first sub-expansion convolution layer is an expansion convolution layer with a convolution kernel of 3×3 and DF=1 (DF=1 means that no interval exists between adjacent pixels collected during the convolution calculation), the second sub-expansion convolution layer is an expansion convolution layer with a convolution kernel of 3×3 and DF=2 (DF=2 means that one interval pixel exists between the adjacent pixels collected during the convolution calculation), and the third sub-expansion convolution layer is an expansion convolution layer with a convolution kernel of 3×3 and DF=3 (DF=3 means that two interval pixels exist between the adjacent pixels collected during the convolution calculation); in the embodiment, expansion convolution having three convolution kernel expansion sizes is adopted to aggregate feature information (i.e., the feature maps) of different scales, and the convolution kernel with the size of 3×3 can well extract the noise features, such as the rain lines, the mist, the snowflakes, or the like. In addition, numbers of channels of the feature maps are kept consistent in the encoding stage and the decoding stage; that is, the numbers of the channels of the feature maps output in the coding network layer and the decoding network layer are the same. Therefore, in the present embodiment, the expansion convolution with different convolution kernel expansion sizes is utilized, and the features of different scales are aggregated together, such that the image information contained in the extracted features can be increased and is richer; it should be noted that, for the noise features, such as the rain lines, the snowflakes and the mist, which have irregular shapes and sizes and may change with a wind direction at any time, a noise feature extraction effect is better by adopting a multi-scale feature aggregation technical means; for example, the features are richer than features extracted using convolution with convolution kernels of a single size, such that the obtained environment noise feature can more clearly reflect the physical feature of the noise (such as the rain lines, the mist and the snowflakes) corresponding to the weather type in the to-be-processed image, and then, the definition of the denoised image corresponding to the to-be-processed image can be improved. In an implementation, input of the feature aggregation dense convolution module can be feature blocks with different scales, and output thereof is a feature block with an unchanged size.

The dense connection network module is configured to perform convolution calculation and data screening on the M second noise features to obtain a plurality of convolution feature maps. In an implementation, as shown in FIG. 6, the dense connection network module includes a plurality of dense connection modules, and each dense connection module includes a convolution layer (Conv) and an activation function layer (for example, ReLu function layer, i.e., ReLu).

The fully connected layer is configured to aggregate the M second noise features and the plurality of convolution feature maps to obtain an aggregation feature. In an implementation, as shown in FIG. 6, the fully connected layer includes a Concat function layer (i.e., Concat) and a convolution layer with a convolution kernel of 1×1 (1×1Conv).

For example, as shown in FIG. 6, assuming that the dense connection network module includes 3 dense connection modules which are a first dense connection module, a second dense connection module, and a third dense connection module respectively, a fusion feature obtained by fusing the M second noise features may be used as input of the first dense connection module, the fusion feature obtained by fusing the M second noise features and the convolution feature map output by the first dense connection module may be used as input of the second dense connection module, and the fusion feature obtained by fusing the M second noise features, the convolution feature map output by the first dense connection module, and the convolution feature map output by the second dense connection module may be used as input of the third dense connection module; the fusion feature obtained by fusing the M second noise features, the convolution feature map output by the first dense connection module, the convolution feature map output by the second dense connection module, and the convolution feature map output by the third dense connection module may be used as input of the fully connected layer, and the feature map output by the fully connected layer may be fused with the feature maps (such as the first feature map, the downsampled feature map, and the upsampled feature map) input to the M expansion convolution layers (that is, aggregation is performed), so as to obtain the aggregation feature.

Therefore, in the present embodiment, after the M second noise features with different scales are fused, the fusion feature obtained by fusing the M second noise features is input into one dense connection network module, and then, the features of all stages are aggregated by the Concat layer in the fully connected layer, such that the downsampled feature map obtained in the encoding stage and the feature information in the non-noise image feature can be depicted in more detail, and more image details can be recovered after noise information (i.e., the noise features), such as the rain lines, the mist, the snowflakes, or the like, can be removed in the decoding stage, thereby reducing a distortion degree of the denoised image corresponding to the to-be-processed image.

It should also be noted that a loss function of the image enhancement model may be a mean absolute error function. It should be noted that in the present embodiment, since the noise information (i.e., the noise features), such as the rain lines, the mist, the snowflakes, or the like, is sparse, and the embodiment depicts a degree of difference between the predicted denoised image f(x) after the noise information, such as the rain lines, the mist, the snowflakes, or the like, is removed and a true noiseless image Y, the mean absolute error (MAE) function which is sensitive to sparse features may be selected as the loss function for training in the present embodiment. In this way, after the loss value corresponding to an input image for model training is determined by using the loss function, the model parameters of the image enhancement model may be adjusted by using the loss value until a training completion condition is satisfied; for example, a number of the training times reaches a preset number or the model parameters of the image enhancement model fit.

In an implementation, the MAE function is shown as follows:

$$L = \frac{1}{HWC} \sum_i \sum_j \sum_k \|\hat{Y}_{i,j,k} - Y_{i,j,k}\|$$

wherein $\hat{Y}_{i,j,k}$ represents the predicted denoised image output by the image enhancement model; H, W, C represent a height, a width and a channel number of the input image of the image enhancement model respectively; $Y_{i,j,k}$ represents the true noiseless image; i, j and k represent the height, the width and the channel number of the image respectively; L represents the loss value.

All the above optional technical solutions may be combined arbitrarily to form optional embodiments of the present disclosure, and are not repeated herein.

An apparatus according to the embodiments of the present disclosure is described below, and may be configured to perform the method according to the embodiments of the present disclosure. For details not disclosed in the embodiments of the apparatus according to the present disclosure, reference is made to the embodiments of the method according to the present disclosure.

Figure 7:
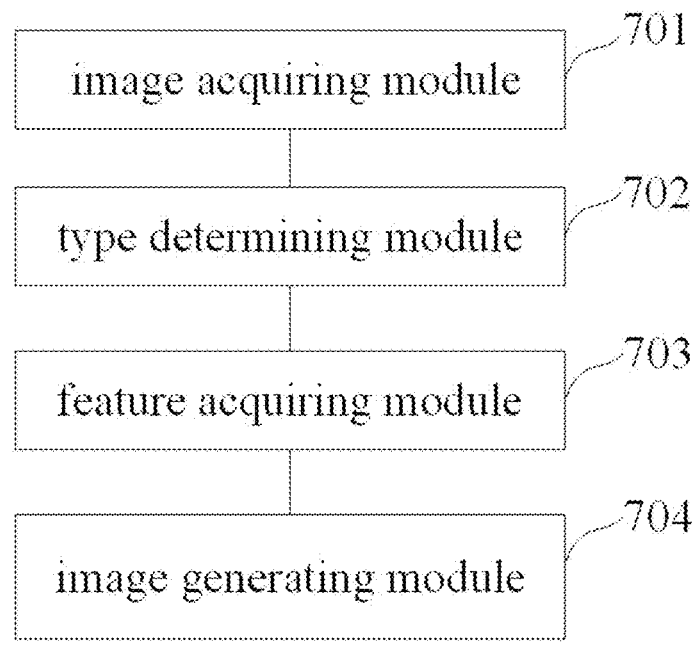
FIG. 7 is a block diagram of an image processing apparatus according to the embodiment of the present disclosure.

FIG. 7 is a schematic diagram of an image processing apparatus according to the embodiment of the present disclosure. As shown in FIG. 7, the image processing apparatus includes:
an image acquiring module 701 configured to acquire a to-be-processed image;
a type determining module 702 configured to determine a weather type corresponding to the to-be-processed image;
a feature acquiring module 703 configured to, according to the weather type, acquire an environment noise feature in the to-be-processed image corresponding to the weather type; and
an image generating module 704 configured to obtain a non-noise image feature of the to-be-processed image according to the environment noise feature, and according to the environment noise feature, the non-noise image feature and the to-be-processed image, generate a denoised image corresponding to the to-be-processed image.

In some embodiments, the type determining module 702 is configured to:
input the to-be-processed image into a trained weather type classification model to obtain the weather type corresponding to the to-be-processed image;
the weather type classification model is a residual network obtained by performing training based on a sample image and a weather type label corresponding to the sample image.

In some embodiments, the feature acquiring module 703 is configured to:
determine an image enhancement model corresponding to the weather type according to the weather type, the image enhancement model including a noise feature extraction module;
input the to-be-processed image into the noise feature extraction module to obtain the environment noise feature in the to-be-processed image corresponding to the weather type;
the environment noise feature being a feature reflecting a distribution situation of the environment noise corresponding to the weather type in the to-be-processed image.

In some embodiments, the noise feature extraction module includes N expansion convolution layers and aggregation convolution layers, convolution kernel expansion sizes of the expansion convolution layers are different, and N is a positive integer greater than 1; the feature acquiring module 703 is specifically configured to:
input the to-be-processed image into the N expansion convolution layers to obtain N first noise features, sizes of the first noise features being different; and
aggregate the N first noise features using the aggregation convolution layer to obtain the environment noise feature in the to-be-processed image corresponding to the weather type.

In some embodiments, the image enhancement model further includes a convolution layer, a coding network layer, a decoding network layer and an output layer;
the image generating module 704 is configured to:
input the environment noise feature into the convolution layer to obtain a first feature map;
input the first feature map into the coding network layer to obtain P downsampled feature maps and P non-noise image features, P being a positive integer larger than 1;
input the P downsampled feature maps and the P non-noise image features into the decoding network layer to obtain a denoised feature map; and
input the denoised feature map, the first feature map, the environment noise feature and the to-be-processed image into the output layer to obtain the denoised image corresponding to the to-be-processed image.

In some embodiments, the coding network layer includes P cascaded coding network modules, and each coding network module includes a feature aggregation dense convolution module and a max-pooling layer;
the image generating module 704 is specifically configured to:
input the first feature map to the feature aggregation dense convolution module in a first coding network module, so as to obtain the downsampled feature map and the non-noise image feature output by the max-pooling layer in the first coding network module; and input the downsampled feature map output by a (i−1)th coding network module into the feature aggregation dense convolution module in an ith coding network module, so as to obtain the downsampled feature map and the non-noise image feature output by the max-pooling layer in the ith coding network module; i being a positive integer greater than 1 and less than or equal to P.

In some embodiments, the decoding network layer includes P cascaded decoding network modules, and each decoding network module includes a feature aggregation dense convolution module and an upsampling max-pooling layer;

the image generating module 704 is specifically configured to:
input the downsampled feature map output by a Pth coding network module to the feature aggregation dense convolution module in a first decoding network module, and input the non-noise image feature output by the Pth coding network module to the upsampling max-pooling layer in the first decoding network module, so as to obtain an upsampled feature map output by the upsampling max-pooling layer;
input the downsampled feature map output by a (P−j)th coding network module and the upsampled feature map output by the upsampling max-pooling layer in a jth decoding network module into the feature aggregation dense convolution module in a (1+j)th decoding network module; input the non-noise image feature output by the (P−j)th coding network module into the upsampling max-pooling layer in the (1+j)th decoding network module, so as to obtain the upsampled feature map output by the upsampling max-pooling layer in the (1+j)th decoding network module; j being a positive integer equal to or greater than 1 and less than P;
use the upsampled feature map output by the upsampling max-pooling layer in the Pth decoding network module as the denoised feature map.

In some embodiments, the feature aggregation dense convolution module includes M expansion convolution layers, a dense connection network module, and a fully connected layer; expansion sizes of convolution kernels of the expansion convolution layers are different, and M is a positive integer greater than 1;
the M expansion convolution layers are configured to generate M second noise features according to a feature map, and sizes of the second noise features are different;
the dense connection network module is configured to perform convolution calculation and data screening on the M second noise features to obtain a plurality of convolution feature maps;
the fully connected layer is configured to aggregate the M second noise features and the plurality of convolution feature maps to obtain an aggregation feature.

In some embodiments, a loss function of the image enhancement model is a mean absolute error function.

In some embodiments, the weather type includes at least one of: rain, snow and fog;
if the weather type is rain, the environment noise feature is a rain line noise feature; if the weather type is snow, the environment noise feature is a snowflake noise feature; if the weather type is fog, the environment noise feature is a mist noise feature.

In the technical solution according to the embodiment of the present disclosure, the image processing apparatus includes: the image acquiring module configured to acquire the to-be-processed image; the type determining module configured to determine the weather type corresponding to the to-be-processed image; the feature acquiring module configured to, according to the weather type, acquire the environment noise feature in the to-be-processed image corresponding to the weather type; and the image generating module configured to obtain the non-noise image feature of the to-be-processed image according to the environment noise feature, and according to the environment noise feature, the non-noise image feature and the to-be-processed image, generate the denoised image corresponding to the to-be-processed image. In the embodiment, the environment noise features corresponding to different weather types can be acquired, the to-be-processed image can be denoised according to the environment noise features corresponding to the weather types, and a denoised region can be restored and recovered by using the non-noise image features; therefore, with the method according to the embodiment, the noise caused by various weather types can be removed from the to-be-processed image, and the image detail information can be recovered while the noise caused by various weather types is removed, thereby solving the problem of image quality degradation under more weather conditions by using the same technical framework, and improving the image denoising and enhancing effects.

It should be understood that, the sequence numbers of the steps in the foregoing embodiments do not imply an execution sequence, and the execution sequence of each process should be determined by functions and internal logic of the process, and should not constitute any limitation to the implementation process of the embodiments of the present disclosure.

Figure 8:
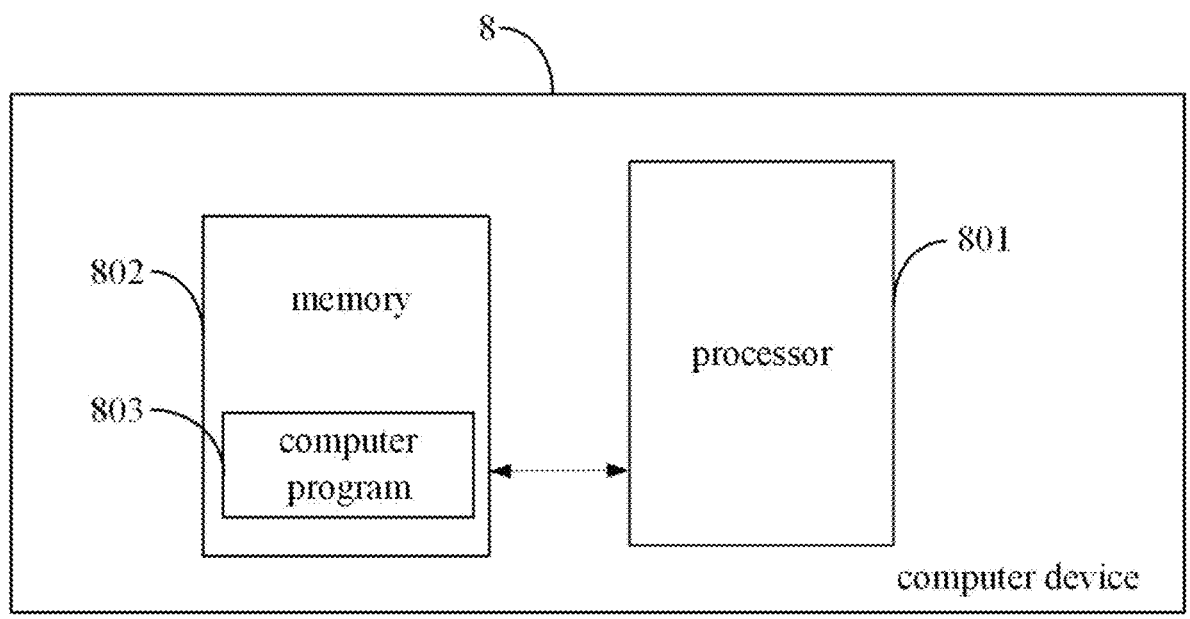
FIG. 8 is a schematic diagram of a computer device according to the embodiment of the present disclosure.

FIG. 8 is a schematic diagram of a computer device 8 according to the embodiment of the present disclosure. As shown in FIG. 8, the computer device 8 according to the present embodiment includes: a processor 801, a memory 802, and a computer program 803 stored in the memory 802 and executable on the processor 801. The steps in the various method embodiments described above are implemented when the processor 801 executes the computer program 803. Alternatively, the processor 801 achieves the functions of each module/unit in each apparatus embodiment described above when executing the computer program 803.

Exemplarily, the computer program 803 may be partitioned into one or more modules/units, which are stored in the memory 802 and executed by the processor 801 to complete the present disclosure. One or more of the modules/units may be a series of computer program instruction segments capable of performing specific functions, the instruction segments describing the execution of the computer program 803 in the computer device 8.

The computer device 8 may be a desktop computer, a notebook, a palm computer, a cloud server or another computer device. The computer device 8 may include, but is not limited to, the processor 801 and the memory 802. Those skilled in the art may understand that a structure shown in FIG. 8 is only an example of the computer device 8 and does not limit the computer device 8, which may include more or fewer components than those shown in the drawings, or some components may be combined, or a different component deployment may be used. For example, the computer device may further include an input/output device, a network access device, a bus, or the like.

The processor 801 may be a Central Processing Unit (CPU), or other general-purpose processors, Digital Signal Processors (DSP), Application Specific Integrated Circuits (ASIC), Field-Programmable Gate Arrays (FPGA) or other programmable logic devices, discrete gates or transistor logic devices, discrete hardware components, etc. The general-purpose processor may be a microprocessor or the processor may be any general processor, or the like.

The memory 802 may be an internal storage module of the computer device 8, for example, a hard disk or memory of the computer device 8. The memory 802 may also be an external storage device of the computer device 8, such as a plug-in hard disk, a Smart Media Card (SMC), a Secure Digital (SD) Card, a Flash Card, or the like, configured on the computer device 8. Further, the memory 802 may also include both the internal storage module and the external storage device of the computer device 8. The memory 802 is configured to store the computer program and other programs and data required by the computer device. The memory 802 may be further configured to temporarily store data which has been or will be outputted.

It may be clearly understood by those skilled in the art that, for convenient and brief description, division of the above functional units and modules is used as an example for illustration. In practical application, the above functions can be allocated to different functional units and modules and implemented as required; that is, an internal structure of the apparatus is divided into different functional units or modules to accomplish all or some of the functions described above. The functional units or modules in the embodiments may be integrated into one processing module, or each of the modules may exist alone physically, or two or more modules are integrated into one module, and the integrated module may be implemented in a form of hardware, or may also be implemented in a form of a software functional module. In addition, specific names of all the functional units or modules are merely for facilitating the differentiation, but are not intended to limit the protection scope of this disclosure. For a specific working process of the units or modules in the above system, reference may be made to the corresponding process in the foregoing method embodiments, which is not repeated herein.

In the above embodiments, the description of each embodiment has its own emphasis. For a part not described in detail in one embodiment, reference may be made to relevant description of other embodiments.

Those of ordinary skill in the art would appreciate that the modules and algorithmic steps of the examples described in combination with the embodiments disclosed herein can be implemented by electronic hardware or a combination of computer software and electronic hardware. Whether these functions are performed by hardware or software depends on a specific application and design constraints of the technical solution. Technical professionals may achieve the described functions in different methods for each particular application, but such implementation should not be considered beyond the scope of the present disclosure.

In the embodiments according to the present disclosure, it is to be understood that the disclosed apparatus/computer device and method can be implemented in other ways. For example, the embodiment of the apparatus/computer device described above is merely schematic. For example, the division of the modules or units is merely logical function division, and there may be other division manners in an actual implementation. For example, a plurality of modules or components may be combined or integrated into another system, or some features may be ignored or not performed. In addition, the displayed or discussed mutual coupling or direct coupling or communication connection may be implemented by using some interfaces. The indirect coupling or communication connection between apparatuses or modules may be implemented in an electric form, a mechanical form, or other forms.

The modules described as separate parts may or may not be physically separate, and parts displayed as modules may or may not be physical modules, may be located at one position, or may be distributed on a plurality of network modules. Some or all of the modules may be selected according to actual needs to achieve the objectives of the solutions of the embodiments.

In addition, the functional modules in the embodiments of the present disclosure may be integrated into one processing module, or each of the modules may exist alone physically, or two or more modules are integrated into one module. The integrated module may be implemented in a form of hardware or in a form of a software functional module.

The integrated module/unit may be stored in a computer-readable storage medium when implemented in the form of the software functional module and sold or used as a separate product. Based on such understanding, all or some of the processes in the method according to the above embodiments may be realized in the present disclosure, or completed by the computer program instructing related hardware, the computer program may be stored in the computer-readable storage medium, and when the computer program is executed by the processor, the steps of the above method embodiments may be realized. The computer program may include a computer program code, which may be in a form of a source code, an object code or an executable file or in some intermediate forms. The computer-readable medium may include any entity or apparatus capable of carrying the computer program code, a recording medium, a USB flash drive, a removable hard disk, a magnetic disk, an optical disk, a computer memory, a Read-Only Memory (ROM), a Random Access Memory (RAM), an electrical carrier signal, a telecommunication signal, a software distribution medium, and so on. It should be noted that content included in the computer-readable medium may be appropriately increased or decreased according to requirements of legislation and patent practice in a jurisdiction, for example, in some jurisdictions, according to legislation and patent practice, the computer-readable medium does not include the electrical carrier signal and the telecommunication signal.

The above embodiments are merely intended to describe the technical solutions of the present disclosure, but not to limit the present disclosure. Although the present disclosure is described in detail with reference to the foregoing embodiments, those of ordinary skill in the art should understand that they may still make modifications to the technical solutions described in the foregoing embodiments or make equivalent replacements to some technical features thereof. Such modifications or replacements do not cause the essence of the corresponding technical solutions to depart from the spirit and scope of the technical solutions of the embodiments of the present disclosure, and should be included in the protection scope of the present disclosure.

What is claimed is:

1. An image processing method, comprising:
   acquiring a to-be-processed image;
   determining a weather type corresponding to the to-be-processed image;
   according to the weather type, acquiring an environment noise feature in the to-be-processed image corresponding to the weather type; and
   obtaining a non-noise image feature of the to-be-processed image according to the environment noise feature, and according to the environment noise feature, the non-noise image feature and the to-be-processed image, generating a denoised image corresponding to the to-be-processed image;

wherein the step of according to the weather type, acquiring the environment noise feature in the to-be-processed image corresponding to the weather type comprises:

determining an image enhancement model corresponding to the weather type according to the weather type, wherein the image enhancement model comprises a noise feature extraction module;

inputting the to-be-processed image into the noise feature extraction module to obtain the environment noise feature in the to-be-processed image corresponding to the weather type, wherein the environment noise feature is a feature reflecting a distribution situation of an environment noise corresponding to the weather type in the to-be-processed image;

wherein the noise feature extraction module comprises N expansion convolution layers and aggregation convolution layers, convolution kernel expansion sizes of the N expansion convolution layers are different, and N is a positive integer greater than 1;

the step of inputting the to-be-processed image into the noise feature extraction module to obtain the environment noise feature in the to-be-processed image corresponding to the weather type comprises:

inputting the to-be-processed image into the N expansion convolution layers to obtain N first noise features, wherein sizes of the N first noise features are different; and aggregating the N first noise features using the aggregation convolution layer to obtain the environment noise feature in the to-be-processed image corresponding to the weather type.

2. The image processing method according to claim 1, wherein the step of determining the weather type corresponding to the to-be-processed image comprises:

inputting the to-be-processed image into a trained weather type classification model to obtain the weather type corresponding to the to-be-processed image;

the weather type classification model is a residual network obtained by performing training based on a sample image and a weather type label corresponding to the sample image.

3. The image processing method according to claim 1, wherein the image enhancement model further comprises a convolution layer, a coding network layer, a decoding network layer and an output layer;

the step of obtaining the non-noise image feature of the to-be-processed image according to the environment noise feature, and according to the environment noise feature, the non-noise image feature and the to-be-processed image, generating the denoised image corresponding to the to-be-processed image comprises:

inputting the environment noise feature into the convolution layer to obtain a first feature map;

inputting the first feature map into the coding network layer to obtain P downsampled feature maps and P non-noise image features, wherein P is a positive integer larger than 1;

inputting the P downsampled feature maps and the P non-noise image features into the decoding network layer to obtain a denoised feature map; and inputting the denoised feature map, the first feature map, the environment noise feature and the to-be-processed image into the output layer to obtain the denoised image corresponding to the to-be-processed image.

4. The image processing method according to claim 3, wherein the coding network layer comprises P cascaded coding network modules, and each of the P cascaded coding network modules comprises a feature aggregation dense convolution module and a max-pooling layer;

The step of inputting the first feature map into the coding network layer to obtain the P downsampled feature maps and the P non-noise image features comprises:

inputting the first feature map to the feature aggregation dense convolution module in a first coding network module to obtain the downsampled feature map and the non-noise image feature output by the max-pooling layer in the first coding network module; and inputting the downsampled feature map output by a (i−1)th coding network module into the feature aggregation dense convolution module in an ith coding network module to obtain the downsampled feature map and the non-noise image feature output by the max-pooling layer in the ith coding network module, wherein i is a positive integer greater than 1 and less than or equal to P.

5. The image processing method according to claim 4, wherein the decoding network layer comprises P cascaded decoding network modules, and each of the P cascaded decoding network modules comprises a feature aggregation dense convolution module and an upsampling max-pooling layer;

the step of inputting the P downsampled feature maps and the P non-noise image features into the decoding network layer to obtain the denoised feature map comprises:

inputting the downsampled feature map output by a Pth coding network module to the feature aggregation dense convolution module in a first decoding network module, and inputting the non-noise image feature output by the Pth coding network module to the upsampling max-pooling layer in the first decoding network module to obtain an upsampled feature map output by the upsampling max-pooling layer;

inputting the downsampled feature map output by a (P−j)th coding network module and the upsampled feature map output by the upsampling max-pooling layer in a jth decoding network module into the feature aggregation dense convolution module in a (1+j)th decoding network module; inputting the non-noise image feature output by the (P−j)th coding network module into the upsampling max-pooling layer in the (1+j)th decoding network module to obtain the upsampled feature map output by the upsampling max-pooling layer in the (1+j)th decoding network module, wherein j is a positive integer equal to or greater than 1 and less than P;

using the upsampled feature map output by the upsampling max-pooling layer in a Pth decoding network module as the denoised feature map.

6. The image processing method according to claim 4, wherein the feature aggregation dense convolution module comprises M expansion convolution layers, a dense connection network module, and a fully connected layer; expansion sizes of convolution kernels of the M expansion convolution layers are different, and M is a positive integer greater than 1;

the M expansion convolution layers are configured to generate M second noise features according to a feature map, and sizes of the M second noise features are different;

the dense connection network module is configured to perform convolution calculation and data screening on the M second noise features to obtain a plurality of convolution feature maps;

the fully connected layer is configured to aggregate the M second noise features and the plurality of convolution feature maps to obtain an aggregation feature.

7. The image processing method according to claim 1, wherein a loss function of the image enhancement model is a mean absolute error function.

8. The image processing method according to claim 1, wherein the weather type comprises at least one of: rain, snow and fog;

if the weather type is rain, the environment noise feature is a rain line noise feature; if the weather type is snow, the environment noise feature is a snowflake noise feature; if the weather type is fog, the environment noise feature is a mist noise feature.

9. An image processing apparatus, configured for the image processing method according to claim 1, comprising:

an image acquiring module configured to acquire a to-be-processed image;

a type determining module configured to determine a weather type corresponding to the to-be-processed image;

a feature acquiring module configured to, according to the weather type, acquire an environment noise feature in the to-be-processed image corresponding to the weather type; and an image generating module configured to obtain a non-noise image feature of the to-be-processed image according to the environment noise feature, and according to the environment noise feature, the non-noise image feature and the to-be-processed image, generate a denoised image corresponding to the to-be-processed image.

10. A computer device, comprising a memory, a processor and a computer program stored in the memory and runnable on the processor, wherein the processor, when executing the computer program, implements the steps of the image processing method according to claim 1.

11. A computer-readable storage medium storing a computer program, wherein the computer program, when executed by a processor, implements the steps of the image processing method according to claim 1.

* * * * *